I. G. HOWELL.
SPRINKLER ATTACHMENT FOR VEHICLES.
APPLICATION FILED AUG. 15, 1917.

1,385,684.

Patented July 26, 1921.

Witness
G. C. Walling
M. L. Morgan

Inventor
I. G. Howell
By
Attorney

UNITED STATES PATENT OFFICE.

ISRAEL G. HOWELL, OF TRENTON, NEW JERSEY, ASSIGNOR OF ONE-HALF TO ALEXANDER PEREY, OF TRENTON, NEW JERSEY.

SPRINKLER ATTACHMENT FOR VEHICLES.

1,385,684.     Specification of Letters Patent.     Patented July 26, 1921.

Application filed August 15, 1917. Serial No. 186,372.

*To all whom it may concern:*

Be it known that I, ISRAEL G. HOWELL, a citizen of the United States, residing at Trenton, in the county of Mercer, State of New Jersey, have invented certain new and useful Improvements in Sprinkler Attachments for Vehicles; and I do hereby declare the following to be a full, clear, and exact description of the invention, such as will enable others skilled in the art to which it appertains to make and use the same.

This invention relates to road sprinkling attachments for automobiles and other vehicles and has for an object to provide an appliance of the above character embodying a water reservoir and means for effecting and controlling the discharge of the contents of said reservoir, there being further provided means of novel construction, arrangement and adjustment through the medium of which the reservoir is detachably applied to a vehicle.

With the above and other objects of similar nature in view, the invention consists in the construction, combination and arrangement of parts, set forth in and falling within the scope of the appended claims.

In the drawing:—

Figure 1:
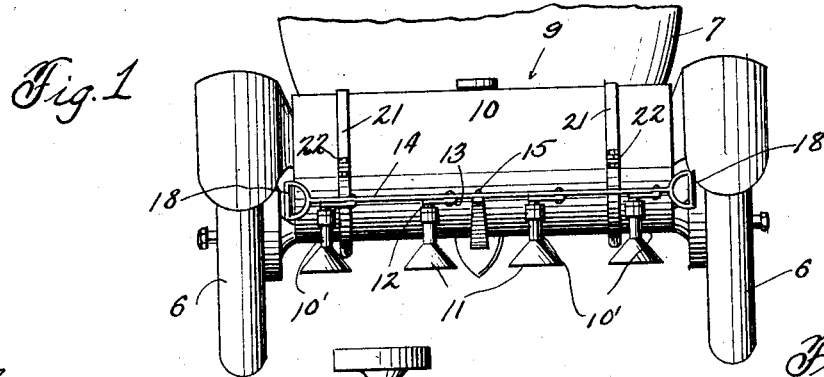
Figure 1 is a rear elevation of a motor vehicle equipped with the invention.

Referring now more particularly to the accompanying drawing, there are shown a portion of an automobile including the rear axle 5, wheels 6, body 7 and foot board 8, all of ordinary construction.

The invention is shown generally at 9 as detachably applied to the rear axle 5 of the vehicle and extending rearwardly therefrom. Specifically the appliance consists of a cylindrical reservoir 10 from the bottom of which there projects a plurality of discharge nozzles 10' terminating in downwardly directed sprinkler heads 11. These nozzles are controlled by valves 12 of ordinary construction the stems of which are provided with crank extensions 13. Connecting the cranks 13 of the valves and swinging with them is an operating bar 14 centrally of which there is formed a slot receiving a pin 15 on a rod 16, said rod extending forwardly beneath the vehicle and being connected at its forward end to a foot lever 17 that is pivotally supported upon the foot board 8. Thus by operating the lever 17 it is evident that the rod 16 is moved forward or backward, the bar 14 is swung on and with the cranks 13, and the valves 12 are simultaneously actuated to regulate the flow of water through the sprinkler heads. The operating bar 14 is also provided at its ends with handles 18 so that it may be swung by a pull or a push by a person on the ground at either side of the vehicle as will be understood.

Figure 2:
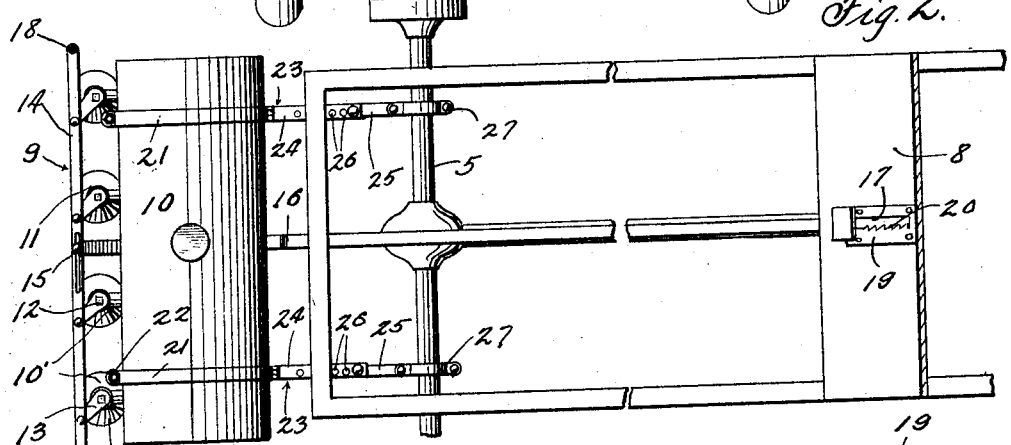
Fig. 2 is a top plan view thereof, parts of the vehicle being broken away.
Figure 3:
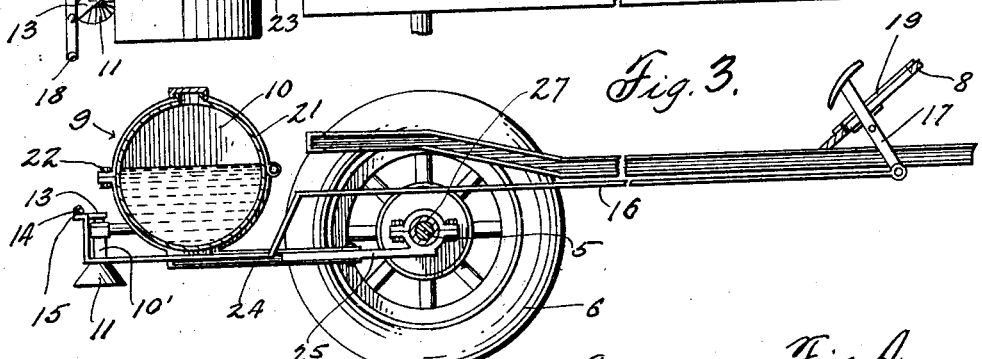
Fig. 3 is a longitudinal section taken on the line 3—3 of Fig. 2.
Figure 4:
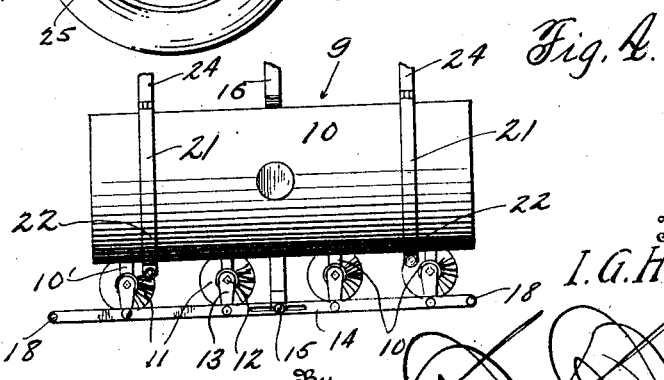
Fig. 4 is a fragmental plan view showing the controlling valves in open position.

A plate 19 having a series of ratchet teeth 20 along one edge of a slot therein is secured to the foot board 8 adjacent the foot lever and serves by selective engagement of the latter in said teeth to maintain the valves in their several positions of adjustment. As seen in Fig. 2, the ratchet teeth face forward so that the manual operation of the bar 14 in that direction which pushes the rod 16 forward is permitted, but when the lever has been swung forward and engaged with a tooth 20, it will be necessary for the driver to disengage it therefrom before the bar 14 can be moved in the other direction. According as the swinging of the cranks 13 opens or closes the valves, this engagement of the lever with the teeth will lock them either open or closed, and will prevent their movement by the handles 18 from either of such positions. The bar 14 swings bodily by reason of its pivotal support on the several cranks, whereas the rod 16 moves longitudinally: therefore the pin 15 at the rear end of the rod must travel in the slot therein when the parts are adjusted. The bar 14 may be said to be shown in Fig. 2 at the rear extreme position, and when the foot lever 17 is moved forward the entire bar 14 moves forward to move the cranks to their other extreme position.

For supporting the reservoir detachably from the axle 5, there is utilized a pair of strap clamps 21 each including a pair of hingedly connected arcuate sections which encircle the reservoir and are securely held in position by a bolt 22. Fixed to and extending forwardly from the lower hinged section of each clamp 21 is a bar 23 including separable sections 24 and 25 the former having therein a series of apertures 26 while the latter is equipped with spaced bolts that are engaged selectively in the apertures 26 whereby to shorten or lengthen the bar as is evident.

At the ends of the bars 21 remote from the reservoir additional clamps 27 are provided to detachably engage the axle 5 of the vehicle. It is understood that by reason of the adjustability of the bars 23 the device may be applied to vehicles generally without regard to their type or sizes.

What I claim is:—

1. In a sprinkler attachment for vehicles, the combination with a supporting frame, a tank carried thereby and having a plurality of discharge nozzles, a control valve for each nozzle, and a crank on its stem; of a transverse bar pivoted on the several cranks and having handles at its extremities, a rod having connection with said bar, a foot lever connected with the front end of said rod, and a toothed plate with which said lever may be engaged in its various positions of adjustment.

2. In a sprinkler attachment for vehicles, the combination with a supporting frame, a tank carried thereby and having a plurality of discharge nozzles, a control valve for each nozzle, and a crank on the upper end of its stem; of a transverse bar pivoted on the several cranks and having handles at its extremities and a longitudinal slot in its body, a rod having a pin at its rear end for engagement in the slot of said bar, a foot lever connected with the front end of said rod, and a plate adapted to be mounted on the vehicle and having a slot in which said lever moves, one edge of the slot being provided with ratchet teeth disposed for engagement in the foot lever to hold it at times against movement in one direction.

In testimony whereof, I affix my signature in the presence of two witnesses.

ISRAEL G. HOWELL.

Witnesses:
SAMUEL STEWART,
LOUIS NOSZLOPY.